United States Patent [19]

Yamaguchi

[11] Patent Number: 5,084,836
[45] Date of Patent: Jan. 28, 1992

[54] PARALLEL SIGNAL PROCESSING SYSTEM

[75] Inventor: Hirohisa Yamaguchi, Tokyo, Japan

[73] Assignee: Kokusai Denshin Denwa Co., Ltd., Tokyo, Japan

[21] Appl. No.: 399,555

[22] PCT Filed: Apr. 1, 1989

[86] PCT No.: PCT/JP89/00351
§ 371 Date: Jul. 26, 1989
§ 102(e) Date: Jul. 26, 1989

[87] PCT Pub. No.: WO89/09448
PCT Pub. Date: Oct. 5, 1989

[30] Foreign Application Priority Data
Apr. 1, 1988 [JP] Japan .................. 63-78120

[51] Int. Cl.$^5$ ............................................ G06F 13/38
[52] U.S. Cl. ............................ 395/800; 364/931.41; 364/935.3; 364/935.6; 364/929.1; 364/DIG. 1; 364/DIG. 2
[58] Field of Search ... 364/200 MS File, 900 MS File

[56] References Cited
U.S. PATENT DOCUMENTS
4,204,251  5/1980  Brudevold .................. 364/200

FOREIGN PATENT DOCUMENTS
58-99868  6/1983  Japan .
59-157761  9/1984  Japan .

Primary Examiner—Thomas M. Heckler
Attorney, Agent, or Firm—Armstrong, Nikaido, Marmelstein, Kubovcik, & Murray

[57] ABSTRACT

A plurality of processor units (6a ... 6n), and a single host processor (4) coupled with the processor units (6a ... 6n) through transparent memories (10a ... 10n) are provided for reading out results of parallel processing by the processor units. Each of the transparent memories (10a ... 10n) has a first bus (11a, 11b) for coupling processors (1a ... 1n) with memories (2a ... 2n) in the processor units (6a ... 6n), a second bus 12a, 12b) for coupling adjacent processor units, a first switch (13a, 13b, 14a, 14b) for switching the first bus, and the second bus, and a second switch (16) for switching direction of the second bus. The host processor (4) switches the first switch and the second switch, and accesses all the memories (2a ... 2n) simultaneously, and reads out those memories (2a ... 2n) simultaneously.

2 Claims, 3 Drawing Sheets

PARALLEL SIGNAL PROCESSING SYSTEM

FIELD OF THE INVENTION

The present invention relates to a parallel signal processing system in which an input signal is divided to a plurality of sub-signals each of which is processed in parallel, and the resultant parallel signals are read out in a short time.

BACKGROUND OF THE INVENTION

When a signal, such as a picture signal which has a large amount of information, is processed at high speed, it is advantageous to separate the signal to be processed into a plurality of sub-signals, each of which is processed in parallel at the same time, and to read out the processed outputs of each separated sub-signal in a short time.

FIG. 3 shows a prior parallel signal processing system. The following description is directed to the final stage of the parallel signal processing to read out the separated parallel results stored in each parallel memory.

In the figure, the numeral 1 ($1a$-$1n$) is a signal processing element (called a processor hereinafter) for processing a plurality of separated sub-signals, 2 ($2a$-$2n$) is a memory for storing the signal processed by the processor 1, 3 is an address bus for coupling the processor 1 and the memory 2 by an address line (A), a data line (D) and a control line (C), 4 is a host processor for controlling a plurality of element processors, 5 is a selector for selecting the element processor to be connected to the host processor according to the control of the host processor 4, and 6 is a processor unit which includes an element processor 1 and a memory 2. Eight processor units (n=8) are coupled with one another in parallel in the embodiment of FIG. 3.

When the output signals, processed by each processor units 6, are read out, a port of each element processor 1 is selected by the selector 5 sequentially, and the signals in the memories are transferred to the host processor according to the handshake protocol.

However, the prior system has the disadvantages that the signal transfer speed is only 1.5 Mbit/sec (700 nsec) in the typical embodiment, and it takes considerable time to switch the element processors which are the information source. Therefore, when the number of processors 1 in parallel increases, it takes a long time to read out the resultant output signals and the real time, read out is impossible, although the signal processing capability increases. Although a prior direct memory access system would be useful to read out the output signals quickly, the control of that system would be very complicated when the number of parallel processor units 6 is large, and therefore, the total processing speed of the parallel signals decreases.

SUMMARY OF THE INVENTION

The object of the present invention is to overcome the disadvantages of a prior system, and to provides a parallel signal processing system which processes parallel signals with high speed.

The feature of the present invention is a parallel signal process system comprising a plurality of processor units each having a processor for processing a signal which is divided to a plurality of sub-signals, and a memory coupled with the processor through an internal bus for storing results processed by the processor. A host processor controls the plurality of processor units. The host processor reads out signals which are processed by the plurality of processor units in parallel. A first bus couples the processor with the memory. A second bus couples adjacent processor units. A first switch switches the first bus and the second bus. A second switch switches direction of the second bus. The first switch and the second switch are switched so that signals processed by the plurality of processor units are read out with high speed by the host processor.

DESCRIPTION OF THE PREFERRED EMBODIMENTS

The embodiments of the present invention are now described in accordance with the drawings in detail. The embodiment has a single common bus for both address signal and data signal for the sake of the simplicity of the explanation, but the invention is not restricted to that embodiment.

Figure 1:
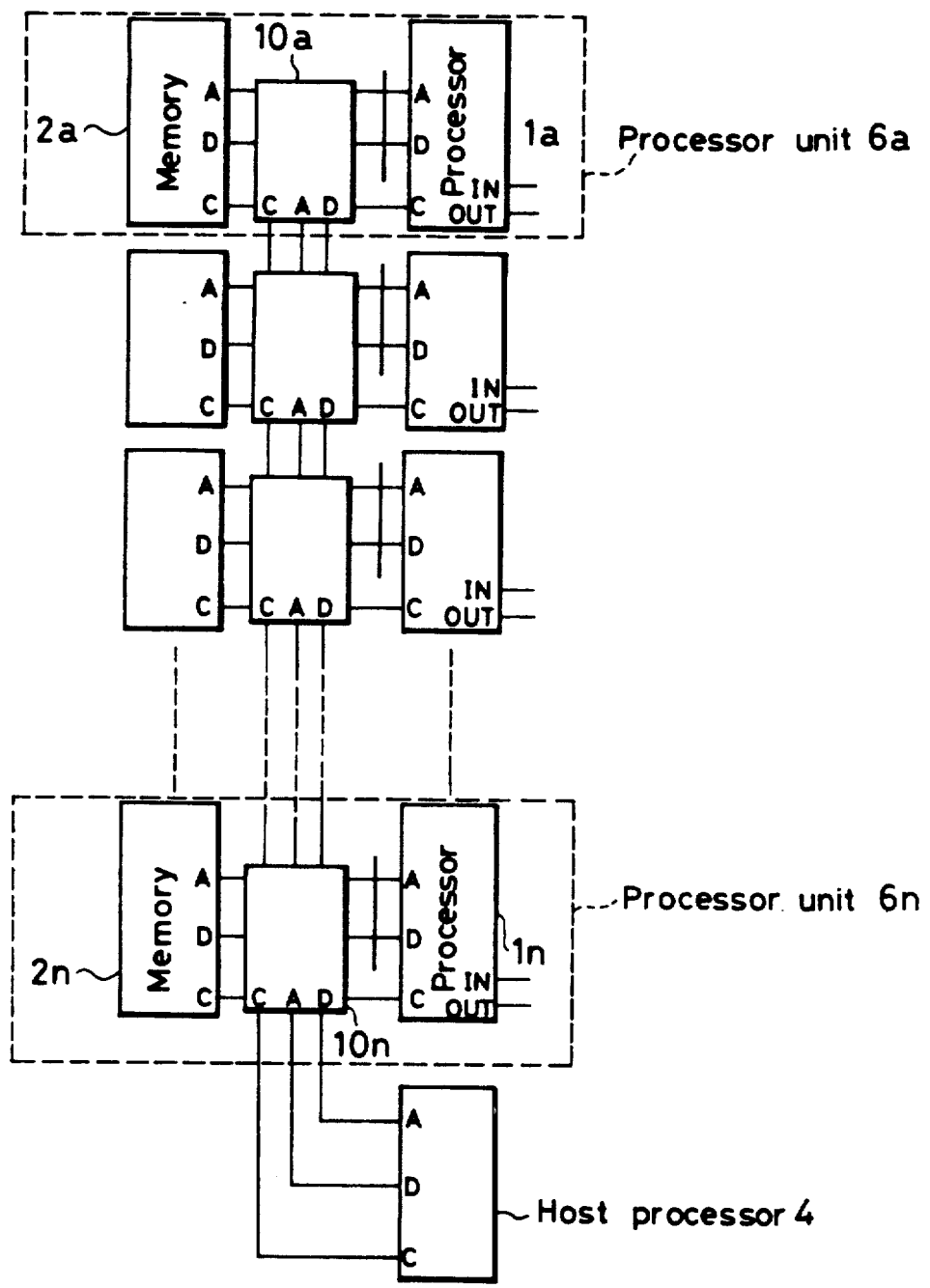
FIG. 1 is a block diagram of the parallel signal processing system according to the present invention.

FIG. 1 is a block diagram of the parallel signal processing system according to the present invention. The feature of FIG. 1 as compared with the prior art is the presence of a transparent memory unit 10 inserted between the processor 1 and the memory 2 so that the host processor 4 can access a plurality of processor units 6 at the same time. The transparent memory 10 which is the feature of the present invention is now described in detail together with the memory 2.

Figure 2:
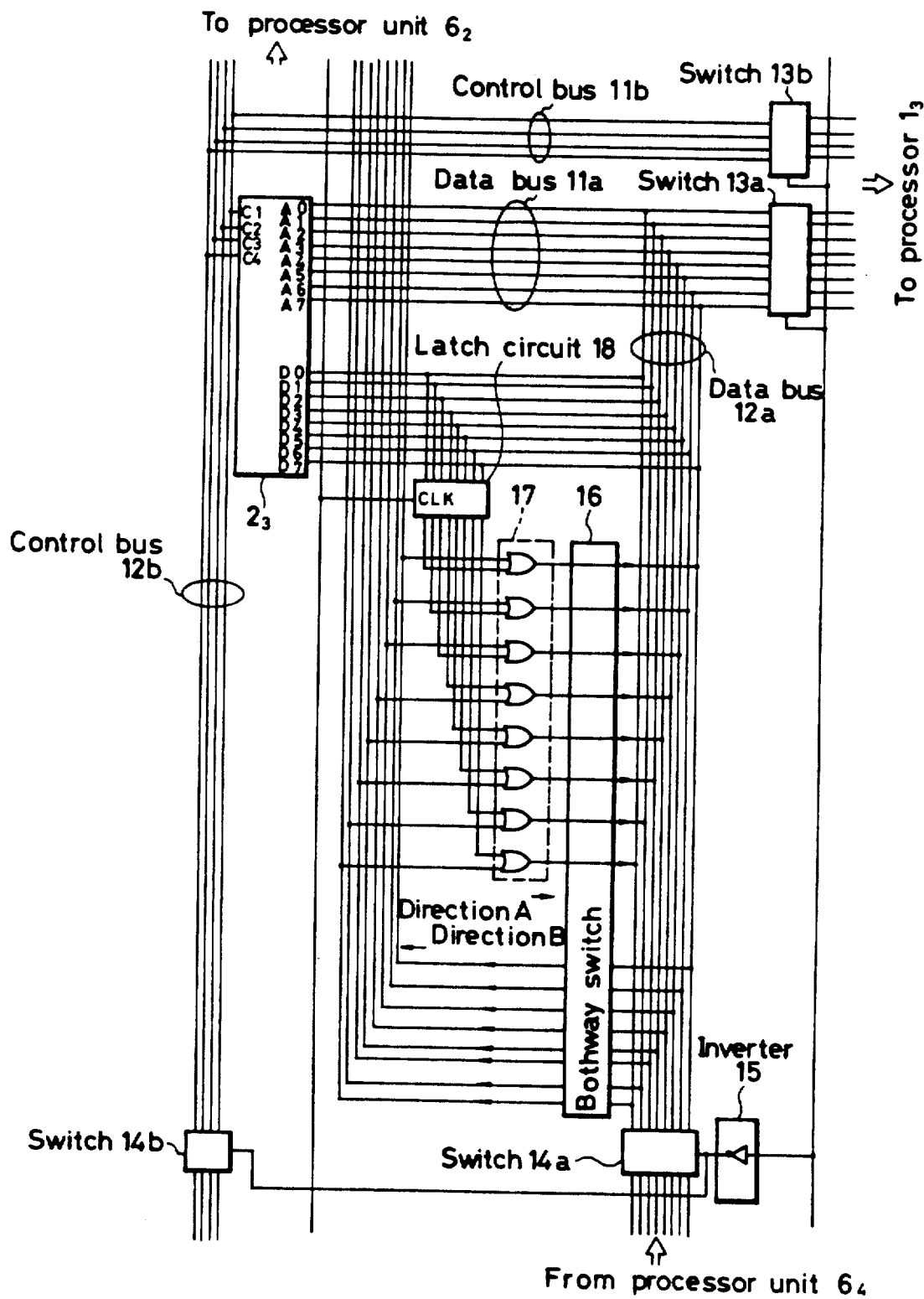
FIG. 2 is a block diagram of the transparent memory according to the present invention.
Figure 3:
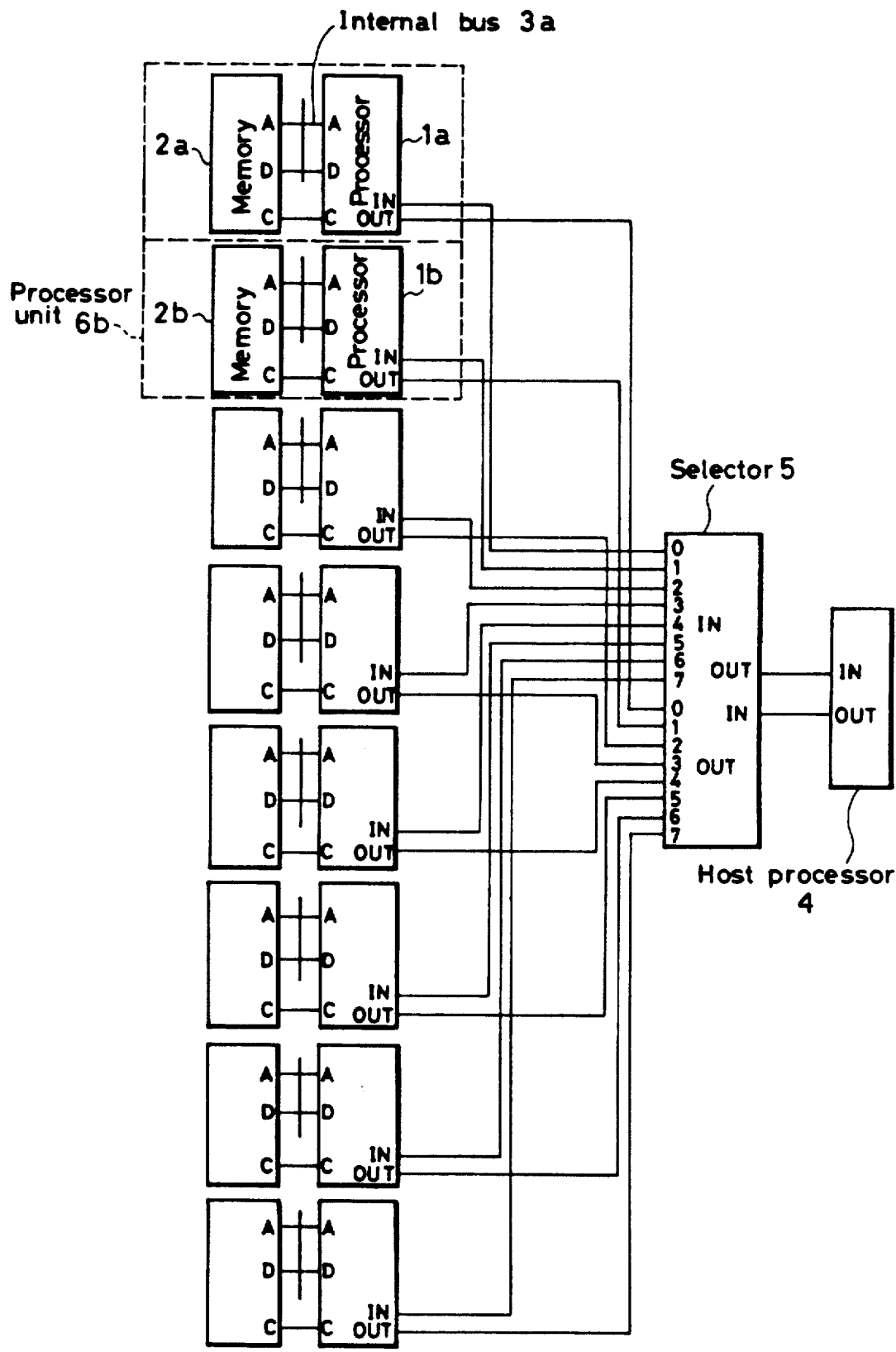
FIG. 3 is a block diagram of a prior parallel signal processing system.

FIG. 2 is a block diagram of the transparent memory according to the present invention. In the figure, the numeral 11 ($11a$, $11b$) is a first bus for connecting the memory 2 to the processor 1 (not shown), $11a$ is an address bus (data bus), $11b$ is a control bus, 12 ($12a$, $12b$) is a second bus for connecting the adjacent processor units 6 to one another, $12a$ is an address bus (data bus), $12b$ is a control bus, 13 and 14 are first switches having, for example, three states buffers for switching the first bus and the second bus 12 ($13a$ and $14a$ are switches for address bus (data bus), and $13b$ and $14b$ are switches for control bus), 15 is an inverter for inverting the switches 13 and 14 in the first switch, 16 is a bothway switch (second switch) for switching the direction of the first address bus $12a$ between the direction A and the direction B, 17 is a logical OR circuit for providing the logical sum of the data read out of the memories 2 and the data read out of other processor units (not shown), and 18 is a latch circuit for holding the output level read out of the memories 2 for a predetermined duration (clock duration). The logical OR circuit 17 is shown by the usual binary positive logical manner in the embodiment, and it should be noted that the OR circuit is replaced by an AND circuit when the circuit is used in a negative logical manner. For the sake of simplicity of the explanation, only the third memory 2 and the third transparent memory unit 10 in n number of memories 2 and the units 10 are shown.

The operation is now described.

The divided sub-signal is processed by the processor $1_3$, and the result is stored in the memory $2_3$ through the first switches 13a and 13b and the first buses 11a and 11b. That operation is the same as that of the prior art.

The read out or the retrieval of the output signals stored in the memories 2a through 2n after processing by the processors 1a through 1n is accomplished as follows.

The host processor 4, which intends to read out the results of the processing (the host processor 4 at the bottom of FIG. 1), accesses all the memories 2a through 2n simultaneously, by connecting the switches 14a and 14b in the first switch group which includes the switches 13a, 13b, 14a and 14b, and by switching the second switch 16 to the direction B. Thus, the address signal is transferred to the adjacent processor unit through the bothway switch 16. The address signal from the host processor 4 is applied to the terminals A0 through A7 of the memory 2 of all the processor units 6a through 6n as the common address simultaneously, and the logical sum of the content in the common addresses of all the memories 2a through 2n at the output terminals D0 through D7 is accomplished by the logic circuit 17 (OR circuit). A latch circuit 18 is provided for keeping the data read out of the memories, as the data read out of the memories is lost in a short time. The bothway switch 16 is switched from the direction B to the direction A when the data is read out after the address signal is applied to the memories.

It should be noted in the present invention that the address to which the processed result is stored differs from the address for each processor 1a through 1n, and null data 0 (all 0 bits word) is stored in the address of the other processors. Therefore, the host processor 4 can take the result which the host processor 4 wishes, although the host processor 4 does not recognize which processor provides that result, in spite of the logic OR operation, since only one input to the OR circuit has information, but the others are null.

As described above, according to the present invention, each memory 2a through 2n has not only the bus for the processors 1a through 1n, but also the other bus for the host processor 4 independently, and the host processor 4 can access all the memories simultaneously and directly. Therefore, the present invention is advantageous to process a signal which has two dimensions, and a signal is divided into small blocks of two dimensions so that each block is processed by the processors 1a through 1n each related to the block. The example of that signal which has two dimensions is a picture signal. Thus, each processor 1a through 1n may be asynchronous from other processors in operation, and therefore, the total parallel processing capability is increased considerably. It should be appreciated that when the present invention is used in a picture signal process, each processor 1a through 1n must have a frame memory of one frame, and that frame memory is implemented by a single chip memory which has the capacity of 256 cells×256 lines×1 byte.

As described above in detail, the present invention has a processor unit 6 which has a transparent memory between a processor 1 and a memory 2, and therefore, a host processor 4 can access all the memories 2a through 2n simultaneously to read out the memories. Therefore, high speed parallel processing is accomplished, and even when the number of processor units 6 increases, the control of the processor units is simple. Therefore, the present invention is applicable to a picture signal processes, and/or other signal process which have a large amount of information.

The present invention is used for high speed parallel signal processing of a signal which has a large amount of information, like a picture signal. The present invention can be used in such apparatuses, for instance, a television standard conversion apparatus, and an information compression apparatus for narrow band transmission of a moving picture signal.

What is claimed is:

1. A parallel signal processing system comprising:
   a) a plurality of processor units parallelly connected, each processor unit having
      1) a processor for processing one subsignal of a signal which is divided to a plurality of sub-signals,
      2) a memory coupled with said processor through a third bus, said memory for storing said subsignals processed by said processor, and
      3) a memory unit including
         i) a first bus coupling said processor with said memory,
         ii) a second bus for coupling adjacent processor units in parallel,
         iii) a first switch, connected to said first and second buses, for switching input and output directions of said first bus and said second bus, and
         iv) a second switch, connected to said second bus, for switching input and output directions of said second bus; and
   b) a host processor, coupled to said second bus, for controlling said plurality of processor units, said host processor simultaneously reading out said subsignals which are processed by said plurality of processor units in parallel,
      wherein said memories of said plurality of processor units are simultaneously read out by the host processor through said memory unit.

2. A parallel signal processing system according to claim 1, wherein outputs of said plurality of memories of said plurality of processor units are applied to the host processor through a logic OR circuit, an input of which is an output of each memory.

* * * * *